United States Patent

Schnorr et al.

[11] Patent Number: 5,150,353
[45] Date of Patent: Sep. 22, 1992

[54] APPARATUS FOR SCANNING A DISC, AND SUCTION DEVICE FOR HOLDING A DISC FLAT DURING SCANNING

[75] Inventors: Thomas M. Schnorr, Wolfenbüttel; Jurgen G. Hannemann, Seelze, both of Fed. Rep. of Germany

[73] Assignee: Philips and Du Pont Optical Company, Nieuwegein, Netherlands

[21] Appl. No.: 759,724

[22] Filed: Sep. 11, 1991

Related U.S. Application Data

[63] Continuation of Ser. No. 229,375, Aug. 5, 1988, abandoned.

[30] Foreign Application Priority Data

Aug. 7, 1987 [DE] Fed. Rep. of Germany ....... 3726226

[51] Int. Cl.⁵ .................. G11B 23/00; G11B 25/00
[52] U.S. Cl. ......................... 369/270; 369/271
[58] Field of Search ............... 369/270, 271, 263, 264, 369/265, 266, 269, 191

[56] References Cited

U.S. PATENT DOCUMENTS

| | | | |
|---|---|---|---|
| 2,386,166 | 10/1945 | Lissansky | 369/191 |
| 4,234,195 | 11/1980 | Shibata | 274/39 R X |
| 4,367,547 | 1/1983 | Thigpen | 369/271 |
| 4,438,510 | 3/1984 | Matsumoto | 369/271 |

FOREIGN PATENT DOCUMENTS

| | | | |
|---|---|---|---|
| 0081001 | 6/1983 | European Pat. Off. | 369/271 |
| 8203291 | 9/1982 | Fed. Rep. of Germany | 369/271 |

Primary Examiner—John W. Shepperd
Assistant Examiner—Michael C. Kessell
Attorney, Agent, or Firm—David R. Treacy

[57] ABSTRACT

Device for holding an optically readable disc in a flat position during playing has concentric annular depressions to which vacuum is supplied by a passage to a rotatably journalled connection having an airtight leadthrough.

11 Claims, 1 Drawing Sheet

APPARATUS FOR SCANNING A DISC, AND SUCTION DEVICE FOR HOLDING A DISC FLAT DURING SCANNING

This is a continuation of application Ser. No. 07/229,375, filed Aug. 5, 1988 now abandoned.

BACKGROUND OF THE INVENTION

The invention relates to a suction holding device for holding an optically readable disc, which device has approximately the same diameter as the disc.

For conventional gramophone records, that is to say such plates in which the data are provided in groove-shaped depressions, which are modulated at their edges, and which are mechanically scanned by means of a needle, playing apparatuses are known, in which the plate is attached by suction on the turntable by means of vacuum. In such playing apparatuses, twisted or warped plates lie in flat position on the turntable by the attachment by suction to the turn-table so that during playing no rumble disturbances and wow and flutter or the like occur.

SUMMARY OF THE INVENTION

The suction holding device, which has substantially the same diameter as an optically readable plate-shaped data carrier, hereinafter referred to as a disc, has on its holding side concentrically arranged annular depressions and at least one radially extending depression. These depressions are acted upon by a vacuum. Thus, a disc is attached by suction on the holding side of the device. Consequently, discs can be played which have large corrugation, which would normally no longer permit reading out. Moreover, very thin data carriers can be played, such as are formed during the galvanic reproducing steps from the original master to the mould. The suction holding device permits reading out such very thin shells on a corresponding playing apparatus.

For reading out, the suction holding device with a data carrier attached by suction is arranged on the turntable of a playing apparatus. In a large number of playing apparatuses, a kind of drawer is provided, in which the complete mechanical driving means are disposed so that the apparatus is ready for use also when the drawer is extended. In these cases, a disc, attached by suction can be arranged together with the device on the turntable of the playing apparatus, and can be read out on the apparatus without any modification of the latter.

The suction holding device is rotatable. The vacuum is supplied from the side opposite to the holding side by means of a hose which is passed to a rotatably journalled connection member provided at the suction holding device. This connection member has a substantially air-tight lead-through for passing on the vacuum. The vacuum is passed within the device from this air-tight lead-through to the depressions on the holding side of the device.

The suction holding device can also be used in conjunction with such playing apparatuses, in which the mechanical driving means remain in the apparatus and the disc is loaded into the apparatus and is taken to the mechanical driving means by a drawer. In these cases, it is usually sufficient to make the mechanical driving means present in the apparatus accessible from the upper side so that a disc can be placed by means of the suction holding device on the mechanical driving means and can be read out thereon.

Depending upon the nature of the disc, it may be advantageous to provide sealing vanes arranged as a ring at the outer edge of the holding side ring. These sealing vanes should be sufficiently flexible so that they do not lead to twisting of the data carrier attached by suction.

According to a further embodiment of the invention, the holding side of the device is provided with a central depression for receiving a centering mandrel of the turntable of the playing apparatus.

As a rule, the turntables of a playing apparatus for optically readable plate-shaped data carriers, for example for compact discs, are provided with a central mandrel, which engages into the central hole of the data carrier so that the latter is centered. This central mandrel can project slightly upwards above a disposed data carrier. Therefore, it is ensured that the suction holding device is provided on its holding side with a central depression for receiving a centering mandrel of the turntable of the playing apparatus that may project upwards.

According to a further embodiment of the invention, the connection member provided at the device and having an air-tight lead-through for passing the vacuum supplied to it by means of a passage to the depressions provided in the device, is journalled in the device by means of a ball-bearing. A particularly low friction is then obtained so that during playing or reading-out of a data carrier on a playing apparatus the presence of this device becomes manifest in a disturbing manner to a smallest possible extent by a braking torque.

A great advantage of the suction holding device consists in that it is not only suitable to hold a data carrier in a flat position during playing, but also serves to transport the plate-shaped data carrier to the playing apparatus and away from this apparatus, respectively. Thus, it is possible to realize an automatic transport. Moreover, during the transport of a data carrier by means of the suction holding device, there is no longer a risk of the data carrier being touched by the hands, which disturb the reading-out process. This is of particular importance when testing shells or test plates manufactured by means of a mould.

For the manufacture of the plate-shaped optically readable data carriers, first a so-called master is formed, which is provided on one side with a photoresist layer, which is partially exposed and presents after development the data in the form of depressions. This data side of the master is then duplicated time and again via several galvanic reproducing steps to obtain the mould. During each of these reproducing steps, a shell is obtained, which can be tested with respect to the perfect state of the data structure. These shells are very sensitive and often also have a very small thickness so that they have a tendency to warp. The suction holding device according to the invention is particularly advantageous for such shells because they are stretched in a flat position for the testing process, i.e. during playing in a reading-out apparatus, so that their mechanical unstability no longer plays a part. Just with such shells it is important that they are not touched on their data side. Therefore, it is advantageous that the transport of the shell towards the playing apparatus and away from the playing apparatus also takes place by means of the suction holding device because in this case it is no longer required to take hold of the shell.

DESCRIPTION OF THE PREFERRED EMBODIMENT

Figure 1:
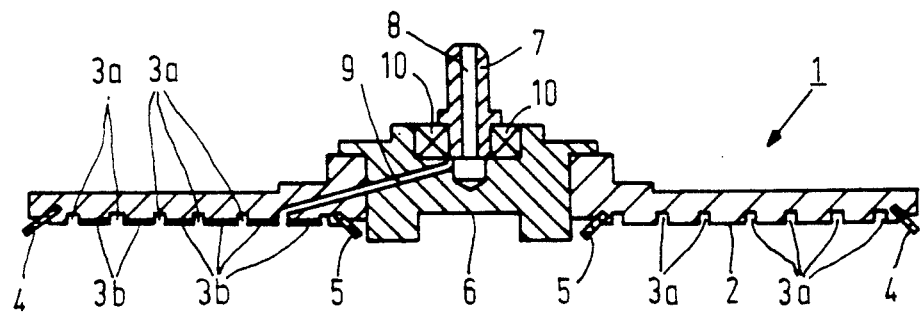
FIG. 1 is a sectional view of a suction holding device.

A suction holding device 1 shown in FIG. 1 has on its holding side 2 concentrically arranged depressions 3a extending in the form of a ring around the center of the device. In addition, a radially extending depression 3b is provided, which interconnects the depressions 3a arranged in the form of a ring. The holding side 2 is further provided at its outer edge with a sealing vane 4 and at the area of its center with a sealing vane 5. These sealing vanes each time extend in the form of a ring on the holding side. By means of these sealing vanes 4 and 5, the region having the depressions 3a arranged in the form of a ring is limited towards the outside and the inside, respectively. At the area of a protruding central portion 6a, within the region surrounded by the sealing vane 5, the device has a depression 6, which serves to receive a central mandrel of the turntable of a playing apparatus shown generally in FIG. 2.

Through a connection member 7 arranged on the side opposite to the holding side of the device, vacuum is established in the depressions 3a arranged in the form of a ring and in the radially extending depression 3b interconnecting the depressions arranged in the form of a ring. For this purpose, the connection member 7 has an air-tight lead-through 8, which is acted upon by vacuum from the outside. The air-tight lead-through 8 of the connection member 7 is connected within the device 1 to a bore-like passage or tube 9, which passes the vacuum from the lead-through 8 on to one of the depressions 3a, which are arranged in the form of a ring and are present on the holding side 2 of the device. Since the depressions 3a arranged in the form of a ring are interconnected by means of the radial depression 3b, all depressions are thus acted upon by vacuum.

In order to obtain a rotatable construction of the suction holding device, the connection member is rotatably journalled within the device by means of a ball-bearing 10. Thus, the connection member 7 can be provided with vacuum from the outside by means of a non-rotatable connection. During the playing process, the connection member 7 is then rotated within the device.

This will be described more fully with reference to FIG. 2, in which the suction holding device shown in FIG. 1 together with an optically readable disc 11 attached by suction is shown. The suction holding device 1 is placed with its central region on a turntable 12 of a playing apparatus 13. The turntable 12, which has at its center an upwardly projecting mandrel 14, which projects into the depression 6 in the device, is provided on a drawer 15 of the playing apparatus 13.

Figure 2:
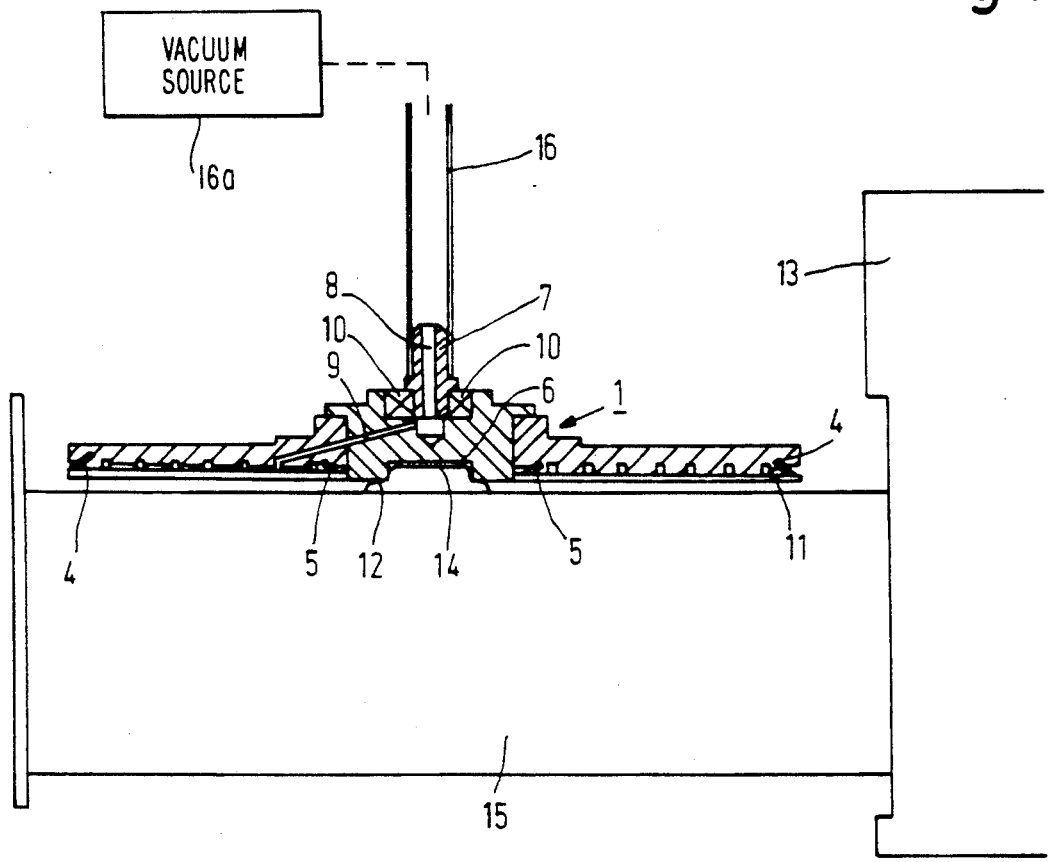
FIG. 2 shows the suction holding device of FIG. 1 with an optically readable plate-shaped data carrier attached by suction in a state in which it is placed on a turntable of a playing apparatus.

As shown in FIG. 2, the protruding central portion 6a enters into the central hole of the disc 11, so that the disc is centered with respect to the device 1. The central portion 6a has a greater diameter than the surface of the turntable 12, so that the disc is entirely free from contact with the turntable and mandrel. As a result, driving power to rotate the disc is provided solely through the device 1; that is, turntable rotation causes the device 1 to rotate; and rotation of the device 1 causes the disc, which is firmly held against the holding side 2 of the device 1, to rotate.

In FIG. 2, the drawer 15 is shown in the extended state with the positioned device and the plate-shaped data carrier attached by suction by means of the device. In this constellation, the disc 11 can be read out by means of the playing apparatus because in the drawer 15 mechanical driving means are provided (not shown further in the Figure), which are ready for use also in the extended state of the drawer 15.

The connection member 7 of the suction holding device 1 is provided by means of a hose 16 with vacuum from a source 16a, which is passed through the lead-through 8 and the tube connection 9 on to the depressions 3a arranged as a ring on the holding side 2 of the device 1. In FIG. 2, the disc 11 is attached by suction and the sealing vanes 4 and 5 seal the vacuum to the outside and to the center of the device, respectively.

The disc 11 is thus held in a flat position on the holding side 2 of the device 1 and can be played. During the playing process, the device 1 and the disc 11 rotate. The rotatably journalled connection member 7 is not rotated and the supply hose 16 is not rotated either. Since the connection member 7 is journalled in the device 1 by means of the ball-bearing 10, however, only a small braking torque is obtained during the playing process due to the presence of the device so that the playing process is not disturbed.

If the hose connection 16 in itself is made comparatively rigid, a data carrier 11 attached by suction can be placed on playing apparatus by the hose connection 16. The necessity of touching the data carrier by the hand or the fingers is then dispensed with.

What is claimed is:

1. A suction holding device for holding a disc relative to a turntable of an apparatus while the apparatus scans the disc, said device comprising a holding element having a holding side having substantially the same diameter as the disc to be scanned, and means for applying a vacuum between the element and the disc, characterized in that on its holding side the element has concentrically arranged annular depressions and at least one radially extending depression communicating with the annular depressions, said means for applying includes a connection member which is rotatably journalled to the element on a side of the element opposite the holding side, said connection member having a first passage therethrough which communicates via an air-tight connection with a second passage through the element, said first passage being arranged for connection to a vacuum source, and said second passage communicating with said at least one radially extending depression, and the holding side of said element faces the turntable, and on its holding side said element comprises means for temporarily connecting mechanically to centering and driving portions of the turntable while the apparatus scans said disc, whereby said device receives driving power for rotating the element from the holding side, while connection to a vacuum source is made from the opposite side.

2. A suction holding device for holding an optically readable data carrier disc with respect to a driving and centering mandrel of a turntable of a playing apparatus while the playing apparatus reads the disc, said device comprising a holding element having a holding side having substantially the same diameter as the disc to be played, and means for applying a vacuum between the element and said disc to hold a first side of said disc against the holding side of said holding element, characterized in that on its holding side the element has concentrically arranged annular depressions and at least one radially extending depression communication with the annular depressions, said means for applying includes a connection member which is toratably journalled to the element on a side of the element opposite the holding side, said connection member having a first passage therethrough which communicates via an air-tight connection with a second passage through the element, said first passage being arranged for connection to a vacuum source, and said second passage communicating with said at least one radially extending depression, and the holding side of said element faces the turntable, and on its holding side said element has a central depression for receiving said driving and dentering mandrel while the apparatus scans a second side of said disc opposite said first side, whereby said device receives driving power for rotating the element from the mandrel on the holding side, while connection to a vacuum source is made from the opposite side.

3. A device as claimed in claim 2, characterized in that the element comprises an outer sealing vane arranged as a ring on the holding side, spaced outward from the outermost of said annular depressions, and an inner sealing vane arranged as a ring on the holding side, spaced outward of said central depression and inward from the innermost of said annular depressions and said at least one radially extending depressions.

4. A device as claimed in claim 3, characterized in that said connection member is arranged for connection of a vacuum hose, and is journalled to said element by a ball bearing.

5. A device as claimed in claim 2, characterized in that said connection member is arranged for connection of a vacuum hose, and is journalled to said element by ball bearing.

6. An apparatus for scanning a surface of a disc, comprising a turntable for rotating a disc to be scanned, said turntable including a disc-centering and driving portion; and means for holding the disc with respect to the turntable, said means comprising a holding element having a holding side having substantially the same diameter as the disc to be scanned, and means for applying a vacuum between the element and said disc while the apparatus scans a second side of said disc opposite said first side, characterized in that on its holding side the element has concentrically arranged annular depressions and at least one radially extending depression communicating with the annular depressions, said means for applying includes a connection member which is rotatably journalled to the element on a side of the element opposite the holding side, said connection member having a first passage therethrough which communicates via an air-tight connection with a second passage through the element, said first passage being arranged for connection to a vacuum source, and said second passage communicating with said at least one radially extending depression, and the holding side of said element faces the turntable, and on its holding side said element comprises turntable engagement means for temporarily connecting mechanically to said disc-centering and driving portion of the turntable while the apparatus scans a second side of said disc opposite said first side, whereby said element receives driving power for rotating the element from the holding side, while connection to a vacuum source is made from the opposite side.

7. An apparatus as claimed in claim 6, characterized in that the element comprises an outer sealing vane arranged as a ring on the holding side, spaced outward from the outermost of said annular depressions, and an inner sealing vane arranged as a ring on the holding side, spaced outward of said turntable engagement means and inward from the innermost of said annular depressions and said at least one radially extending depressions.

8. An apparatus as claimed in claim 7, characterized in that said connection member is arranged for connection of a vacuum hose, and is journalled to said element by a ball bearing.

9. An apparatus as claimed in claim 6, characterized in that said connection member is arranged for connection of a vacuum hose, and is journalled to said element by a ball bearing.

10. An apparatus as claimed in claim 7, characterized in that, on its holding side, said holding element comprises a protruding central portion arranged for engaging a central circular hole of said disc for centering said disc with respect to said holding element, said turntable engagement means forms part of said central portion, and said disc centering and driving portion of said turntable has a diameter less than the diameter of said central hole, and is arranged such that said disc is free from contact with said turntable, whereby said holding element is driven rotatably directly by said disc-centering and driving portion of the turntable, and said disc is centered and driven directly by engagement with said holding element.

11. An apparatus as claimed in claim 6, characterized in that, on its holding side, said holding element comprises a protruding central portion arranged for engaging a central circular hole of said disc for centering said disc with respect to said holding element, said turntable engagement means forms part of said central portion, and said disc centering and driving portion of said turntable has a diameter less than the diameter of said central hole, and is arranged such that said disc is free from contact with said turntable, whereby said holding element is driven rotatably directly by said disc-centering and driving portion of the turntable, and said disc is centered and driven directly by engagement with said holding element.

* * * * *